(12) United States Patent
Schultz et al.

(10) Patent No.: US 6,362,986 B1
(45) Date of Patent: Mar. 26, 2002

(54) VOLTAGE CONVERTER WITH COUPLED INDUCTIVE WINDINGS, AND ASSOCIATED METHODS

(75) Inventors: Aaron M. Schultz, Sunnyvale, CA (US); Charles R. Sullivan, Hanover, NH (US)

(73) Assignee: Volterra, Inc., Fremont, CA (US)

( * ) Notice: Subject to any disclaimer, the term of this patent is extended or adjusted under 35 U.S.C. 154(b) by 0 days.

(21) Appl. No.: 09/814,555

(22) Filed: Mar. 22, 2001

(51) Int. Cl.$^7$ .............................................. H02M 7/5387

(52) U.S. Cl. ....................................................... 363/132

(58) Field of Search ......................... 363/16, 17, 56.01, 363/56.02, 97, 98, 131, 132

(56) References Cited

U.S. PATENT DOCUMENTS

| | | | |
|---|---|---|---|
| 5,204,809 A | | 4/1993 | Andresen |
| 5,764,500 A | * | 6/1998 | Matos .......................... 363/132 |
| 6,018,468 A | * | 1/2000 | Archer et al. .................. 363/17 |

OTHER PUBLICATIONS

"A Novel Modeling Concept for Multi–coupling Core Structures", Pit–Leong Wong, Fred C. Lee, Xiaochuan Jia and Daan van Wyk—Document prepared for the Center for Power Electronics Systems, Virginia Polytechnic Institute and State University, Blacksburg, VA 24061, Jan. 2001.

"Investigating Coupling Inductors in the Interleaving QSW VRW", Pit–Leong, Qiaoqiao Wu, Peng Xu, Bo Yang and Fred C. Lee, Document prepared for the Center for Power Electronics Systems, Virginia Polytechnic Institute and State University, Blacksburg, VA 24061, Mar. 2000.

* cited by examiner

Primary Examiner—Matthew Nguyen
(74) Attorney, Agent, or Firm—Curtis A. Vock, Esq.; Lathrop & Gage L.C.

(57) ABSTRACT

A DC-to-DC converter generates an output voltage from an input voltage. The converter includes first and second inductive windings and a magnetic core. One end of the first winding is switched at about 180 degrees out of phase with one end of the second winding, between ground and the input voltage. The first winding is wound about the core in a first orientation, and the second winding is also wound about the core in the first orientation so as to increase coupling between windings and to reduce ripple current in the windings and other parts of the circuit. This version is a buck converter—versions that form boost, buck-boost and other converters are also provided. The invention also provides a multi-phase DC-to-DC converter for providing an output voltage from an input voltage. The converter has N (N≧2) inductive windings alternatively switched, again in the buck-converter version, between ground and the input voltage. Again, boost, buck-boost, or other versions are also provided. Each of the N windings has a turn-on switching transition separated in switching phase by at least about 360/N degrees from any other of the windings. Each of the windings also has a turn-off switching transition separated in phase by at least about 360/N degrees from any other of the windings. Each of the N windings is wound about the core in like orientation to increase coupling between windings and to reduce ripple current in the windings and other parts of the circuit. The invention also provides suitable core structures.

40 Claims, 16 Drawing Sheets

VOLTAGE CONVERTER WITH COUPLED INDUCTIVE WINDINGS, AND ASSOCIATED METHODS

FIELD OF THE INVENTION

The invention relates generally to switching power converters such as the DC-to-DC buck converters and the boost or buck-boost converters.

BACKGROUND OF THE INVENTION

The parallel power units of prior art DC-to-DC converters typically couple their inputs to a common DC voltage source and their outputs to a load, such as a microprocessor. As known in the art, multiple power units replacing a single power unit can sometimes reduce cost by lowering the power and size rating of components. A further benefit is that multiple power units provide smaller per-power-unit peak current levels, combined with smaller passive components.

The prior art also includes switching techniques in parallel-power-unit DC-to-DC converters. By way of example, power units may be switched with pulse width modulation (PWM) or with pulse frequency modulation (PFM). Typically, in a parallel-unit buck converter, the energizing and de-energizing of the inductance in each power unit occurs synchronously with switches coupled to the input, inductor and ground. Additional performance benefit occurs when the switches of one power unit, coupling the inductors to the DC input voltage or to ground, are out of phase with respect to the switches in another power unit. This "multi-phase," parallel power unit technique results in ripple current cancellation at a capacitor, to which all the inductors are coupled at their output terminals.

It is clear that smaller inductances are needed in DC-to-DC converters to support the response time required in load transients and without prohibitively costly output capacitance. More particularly, the capacitance requirements for systems with fast loads, and large inductors, may make it impossible to provide adequate capacitance configurations, in part due to the parasitic inductance generated by a large physical layout. But smaller inductors create other issues, such as the higher frequencies used in bounding the AC peak-to-peak current ripple within each power unit. Higher frequencies and smaller inductances enable shrinking of part size and weight. However, higher switching frequencies result in more heat dissipation and possibly lower efficiency. In short, small inductance is good for transient response, but large inductance is good for AC current ripple reduction and efficiency.

The prior art has sought to reduce the current ripple in multiphase switching topologies by coupling inductors. For example, one system set forth in U.S. Pat. No. 5,204,809, incorporated herein by reference, couples two inductors in a dual-phase system driven by an H bridge to help reduce ripple current. In one article, Wong, *Investigating Coupling Inductors in the Interleaving QSW VRM*, IEEE APEC (February 2000), slight benefit is shown in ripple reduction by coupling two windings using presently available magnetic core shapes. However, the benefit from this method is limited in that it only offers slight reduction in ripple at some duty cycles for limited amounts of coupling.

It is, accordingly, an object of the invention to provide a voltage converter, such as a DC-to-DC voltage converter, that reduces or eliminates the afore-mentioned difficulties. One specific object of the invention is to provide a converter with two or more windings wound around a common core to preferentially maximize coupling between windings. These and other objects will be apparent in the description that follows.

SUMMARY OF THE INVENTION

In one aspect, a DC-to-DC converter is provided to generate an output voltage from an input voltage. The converter includes first and second inductive windings and a magnetic core. One end of the first winding is switched at about 180 degrees out of phase with one end of the second winding, between ground and the input voltage, to regulate magnitude of the output voltage. Each of the first and second windings is wound about a common core. A pair of windings in proximity to one another or wound about a common core forms a transformer. Of the many common electrical circuit models used to describe a transformer, familiar to those skilled in the art, the "T-model," will be used herein. The T-model comprises two leakage inductances, one associated with each winding, a common magnetizing inductance, and an ideal transformer. The inductance measured with only one of the windings on the core would be the sum of the one winding's leakage inductance and the magnetizing inductance. The first winding is wound about the core in a first orientation, but the second winding is also wound about the core in the first orientation so as to increase coupling between windings and to reduce ripple current associated with the output voltage. To clarify what is intended by the orientation of the windings, when the two windings both have positive current, the flux generated around the main magnetizing flux path by one should be counterclockwise, whereas the flux generated by the other should be clockwise. When the two windings are wound around opposite sides of a square post, both produce flux in the same direction in Cartesian coordinates, given positive current. The issue of what is meant by the same orientation is discussed further below.

In one preferred aspect, the invention is deployed in the form of a buck converter. Those skilled in the art should appreciate that modifications can be made to form a boost, buck-boost, or other converter, as described herein.

The invention has several advantages in addition to those apparent above. For example, the converter of the invention not only provides ripple cancellation in the output capacitor, but can also provide ripple cancellation in the windings and in the switches. It can do so with two or more windings. Moreover, ripple reduction is minimized with "perfect" coupling between the windings—a feature distinctly absent in the prior art. In a further advantage, the invention operates with a magnetic core shaped in one of multiple geometries, whereas the prior art describes only certain shapes. By way of example, Wong, Investigating Coupling Inductors in the Interleaving QSW VRM, IEEE APEC (February 2000), requires E cores with center legs, and U.S. Pat. No. 5,204,809 discloses a doughnut shaped core. In accord with the invention, the core may take several forms, described below, and additionally can provide more power than an E core of the same physical size, because space for a center leg is not needed. Part of the distinction between the prior art and the present invention can be better understood with reference to the intended use of the inductors. One purpose of integrating two separate inductors in the prior art was to save space on a printed circuit board. Coupling between windings on a common core was, in fact, not desired, except to decrease the number of components and overall component area. The present invention actively seeks to couple windings together on the same core.

The invention also provides methods for magnetically coupling inductive devices in a parallel, multiphase power unit regulator topology to reduce current ripples. The method includes the steps of: orienting, in like direction, first and second windings about a common core to increase coupling between the windings; and alternatively activating one end of the first winding about 180 degrees out of phase with one end of the second winding, between a control voltage and the input voltage, to regulate magnitude of the output voltage, wherein magnetizing inductance substantially equals an inductance of the first winding with the core absent the second winding. In one preferred aspect, the control voltage is ground.

The methods of the invention thus enable the use of smaller inductances for transient response optimization without incurring additional current ripple. The invention accordingly lends itself to scalability in coupled magnetic and multiphase topologies. As the number of phases increases almost arbitrarily, the resulting current ripple will continue to be reduced. Further benefits are achieved in replacing standard separate inductors, one per power unit, with a single combined magnetic structure of the invention, including: size reduction, pick and place assembly time and error reduction, lower design cost, implementation, and ease of manufacturing DC-to-DC converters.

Those skilled in the art should also appreciate that the use of coupled magnetics in accord with the invention can reduce current ripple when switching at a particular frequency. If the original switching frequency is lowered, then magnetic coupling will in fact boost each individual winding's current ripple frequency back to the original frequency. Accordingly, the switching frequency of the switches will be reduced with the current ripple being the same as with no coupling. This lower frequency switching results in higher system efficiency. In the various implementations of the invention, when same side switches in different power units operate simultaneously, as they might during transients, then the slopes of inductor currents in each power unit will be substantially maximized. Therefore, both steady-state ripple reduction (by minimizing inductor current slew rates) and short-term transient response enhancement (by maximizing inductor current slew rates) can be achieved simultaneously.

The invention also provides a multi-phase DC-to-DC converter for providing an output voltage from an input voltage. The converter has N (N≧2) inductive windings alternatively switched between a control voltage and the input voltage to regulate magnitude of the output voltage. Each of the N windings has a turn-on switching transition separated in switching phase by about 360/N degrees from any other of the windings. Each of the windings also has a turn-off switching transition separated in phase by about 360/N degrees from any other of the windings. Each of the windings is wound on a common magnetic core wherein magnetizing inductance is greater than about three times the leakage inductance of any one of the windings. Each of the N windings is wound about the core in like orientation to increase coupling between windings and to reduce ripple current associated with the output voltage.

In other aspects, the invention provides core structures suitable for multiple windings in a converter such that the multiple windings collectively excite at one excitation pattern, and collectively do not excite at another excitation pattern. By way of example, an oval-shaped core structure and a square core structure are suitable for two windings; however neither are suitable for more than two windings. As another example, a core structure in the shape of a "ladder"—where one winding is wound around each rung of the ladder—can support two or more windings. Accordingly, by way of specific example, a N-rung ladder structure can support N windings, if desired (N≧2). Another core structure supporting more than two windings, in accord with the invention, includes a wheel-shaped structure with each of the windings wound around separate spokes. Again, N windings may be deployed providing N spokes support the windings. Yet another core structure supporting the invention includes a structure in the shape of two plates (e.g., disks, rectangles, or other shape) coupled by N columns. In each of the aforementioned structures, excitations of the windings can be made to excite all windings, or not. In the case of multiple excitation, for example, by exciting each winding in a ladder configuration, one can make each winding impart flux into neighboring windings in a positive fashion, with flux flow constructively interfering. Alternatively, flux flow from one winding can be made to effectively collide with flux flow of another winding thereby decreasing interaction between windings.

These and other aspects and advantages of the invention are evident in the description which follows and in the accompanying drawings.

DETAILED DESCRIPTION OF THE INVENTION

Figure 1:
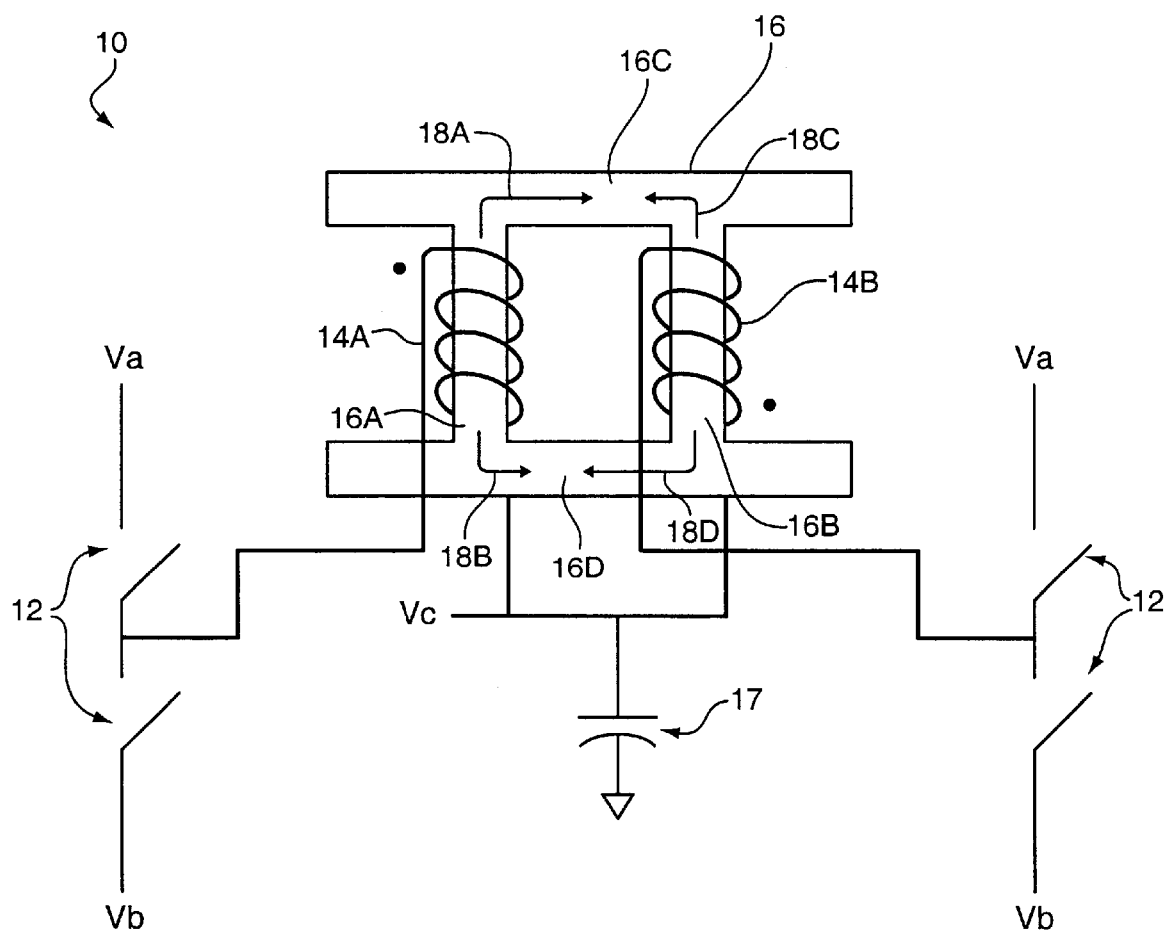
FIG. 1 shows one DC-to-DC converter system constructed according to the invention.

FIG. 1 shows a DC-to-DC converter 10 constructed according to the invention. Converter 10 converts an input voltage (here shown as first and second input voltages Va, Vb) to an output voltage (Vc). Converter 10 has two switching devices 12, known in the art, coupled to the input voltage Va, Vb and responsive to control signals to electrically connect windings 14 to Va, or, alternatively, to Vb. There are two windings 14A, 14B shown in FIG. 1 and wound around a magnetic core 16. Windings 14A and 14B are wound in like orientations about core 16. As will be described in more detail below, core 16 (here in the shape of a "square") can take many shapes, and core 16 can be considered as two "rungs" 16A, 16B, and two "risers" 16C, 16D forming the square core shape. Windings 14A, 14B are thus wound about rungs 16A, 16B, respectively.

During activation (i.e., when windings are coupled to a voltage, Va or Vb), windings 14 effect a change of flux 18 in core 16. In most types of converters, one of Va and Vb will be more positive than Vc, and the other will be less positive. Without loss of generality, it is assumed that Va is more positive than Vc and Vb is less positive (Va>Vc and Vb<Vc). More particularly, when winding 14A is activated by Va, an increase of flux in direction 18A is generated; when winding 14A is activated by Vb, an increase of flux in direction 18B is generated; when winding 14B is activated by Va, an increase of flux in direction 18C is generated; when winding 14B is activated by Vb, an increase of flux in direction 18D is generated. Accordingly, by the techniques of the invention, windings 14 are preferentially activated so as to interact together, and then alternatively so that there is little interaction. Specifically, by activating winding 14A with Va to generate flux 18A, and by activating winding 14B with Vb to generate flux 18D, one can achieve interaction since flux 18A flows into winding 14B and rung 16B, and flux 18D flows into winding 14A and rung 16A. A similar interaction is achieved by activating winding 14A with Vb while activating winding 14B with Va; in this case flux 18B flows into winding 14B and rung 16B, and flux 18C flows into winding 14A and rung 14A.

Yet it is also desirable at times to minimize the interaction of windings 14A, 14B with one another, in accord with the invention. This is achieved by simultaneously connecting windings 14A, 14B to Va, or, alternatively, to Vb. With such activation by Va, flux 18A "collides" with flux 18C; with such activation by Vb, flux 18B collides with flux 18D. There is thus little flux flow and thus little interaction between windings 14A, 14B with like activation by Va or Vb.

In one preferred embodiment, Vb is ground, and Vc is the output, facilitated by output electronics 17, so that converter 10 operates like a buck converter. In another embodiment, Vc is input, Vb is ground, and Va is the output, so that converter 10 operates like a boost converter. In yet another embodiment, Va is the input, Vb is the output, and Vc is ground, so that converter 10 operates like a boost converter. Further such permutations are possible, in some cases using more switches 12. In Robert W. Erickson's *Fundamentals of Power Electronics*, p. 149–151, incorporated herein by reference, there are shown twelve different non-isolated dc-dc converters, any of which is the basis for another embodiment of this invention, in which multiple parallel out-of-phase sections are used with the inductors coupled as described herein. Furthermore, transformer-isolated converters such as forward converters that use inductors separate from their transformers are the basis for other embodiments of the invention, as described above. Transformer-isolated topologies that use the transformer as the main inductive element, such as the flyback converter, are the basis for other embodiments of the invention, as described above, except that the coupled inductive structure has pairs of windings replacing each single winding.

With selected operation and activation of windings 14A, 14B, there is very little ripple associated with the output current. The prior art has not taught maximizing coupling between windings on a common core to reduce ripple current. This coupling is achieved in part because of the like orientation of windings 14A, 14B about rungs 16A, 16B, and in part by using as little as practical air gap in the flux path 18 through the two windings. Each winding 14A, 14B has a leakage inductance and a magnetizing inductance, as defined by terminal characteristics of the standard T-model. In the preferred embodiment of the invention, the magnetizing inductance is greater than at least three times the leakage inductance of either winding.

Figure 2:
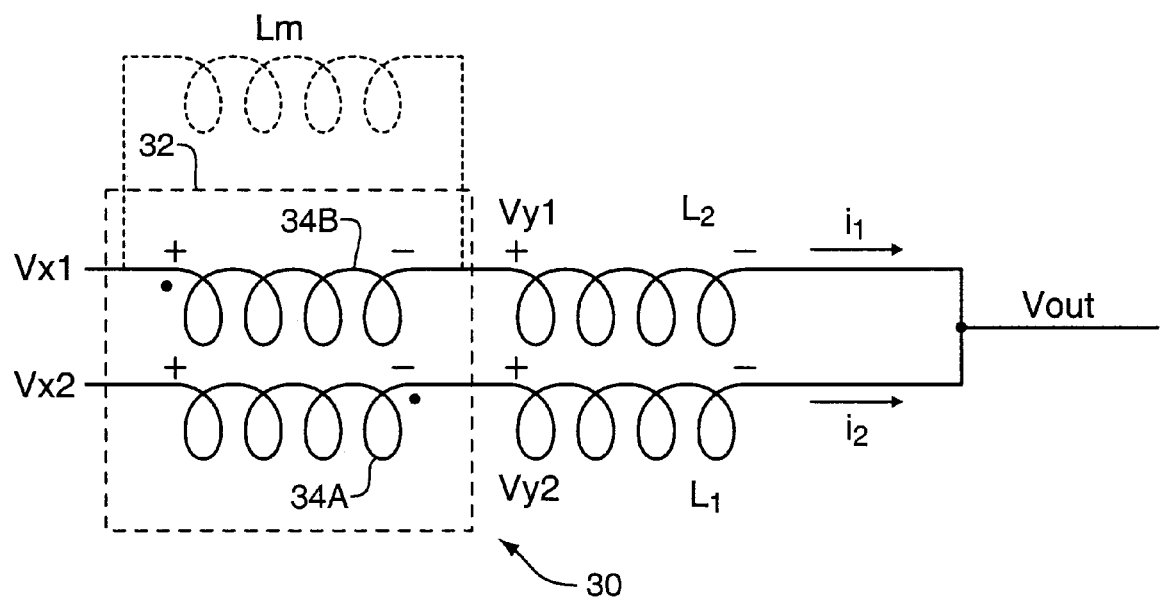
FIG. 2 shows a model operatively illustrating a circuit for a two-wide coupled magnetic device used in a DC-to-DC switching power supply, in accord with the invention.

The invention of preferred embodiments thus involves the use of magnetic core structures that enhance coupling among windings coupled with the structures. For illustrative purposes, the benefits of such coupling can be shown as a model employing an ideal transformer, as in FIG. 2. Specifically, FIG. 2 shows a circuit model 30 modeling a coupled, two winding magnetic device constructed with the teachings of the invention to generate an output voltage Vout. The dotted line 32 represents the ideal transformer, within which reside two windings 34A, 34B. Winding 34A is shown connected between control voltages Vx2, Vy2; winding 34B is shown connected between control voltages Vx1, Vy1. Two leakage inductances $L_1$, $L_2$—one for each winding 34A, 34B, respectively—connect to the ideal transformer 32. Magnetizing inductance Lm connects in parallel to ideal transformer 32. For transformer applications, those skilled in the art will appreciate that one winding 34 may be used for source excitation delivering power, and that the other winding 34 may be used for a load receiving power; however in accord with the teachings of the invention, the operations of windings 34 include the excitation of both windings 34A, 34B.

More particularly, to explain how multiple windings on a single core (e.g., as in FIG. 1) interact, the "perfect" coupling case is described first. With perfect coupling between windings 34A, 34B, the value of Lm, the magnetizing inductance, is infinite. Infinite magnetizing inductance means zero reluctance within the core, which in turn implies that no net winding current can ever flow, even with changing flux through the core, where net winding current is used to denote the different between the two winding currents. In FIG. 2, current $i_1$ represents winding current for winding 34B, and current $i_2$ represents winding current for winding 34A. Changes in winding current $i_1$, $i_2$ will only occur when there is a change in the flux traveling outside the perfect flux-conducting core. Flux in a zero reluctance core will travel without "resistance" from any point within the core to any other location. Where the flux flows, and in what magnitude, are determined by the applied electrical excitations and reigning constitutive laws.

Figure 3:
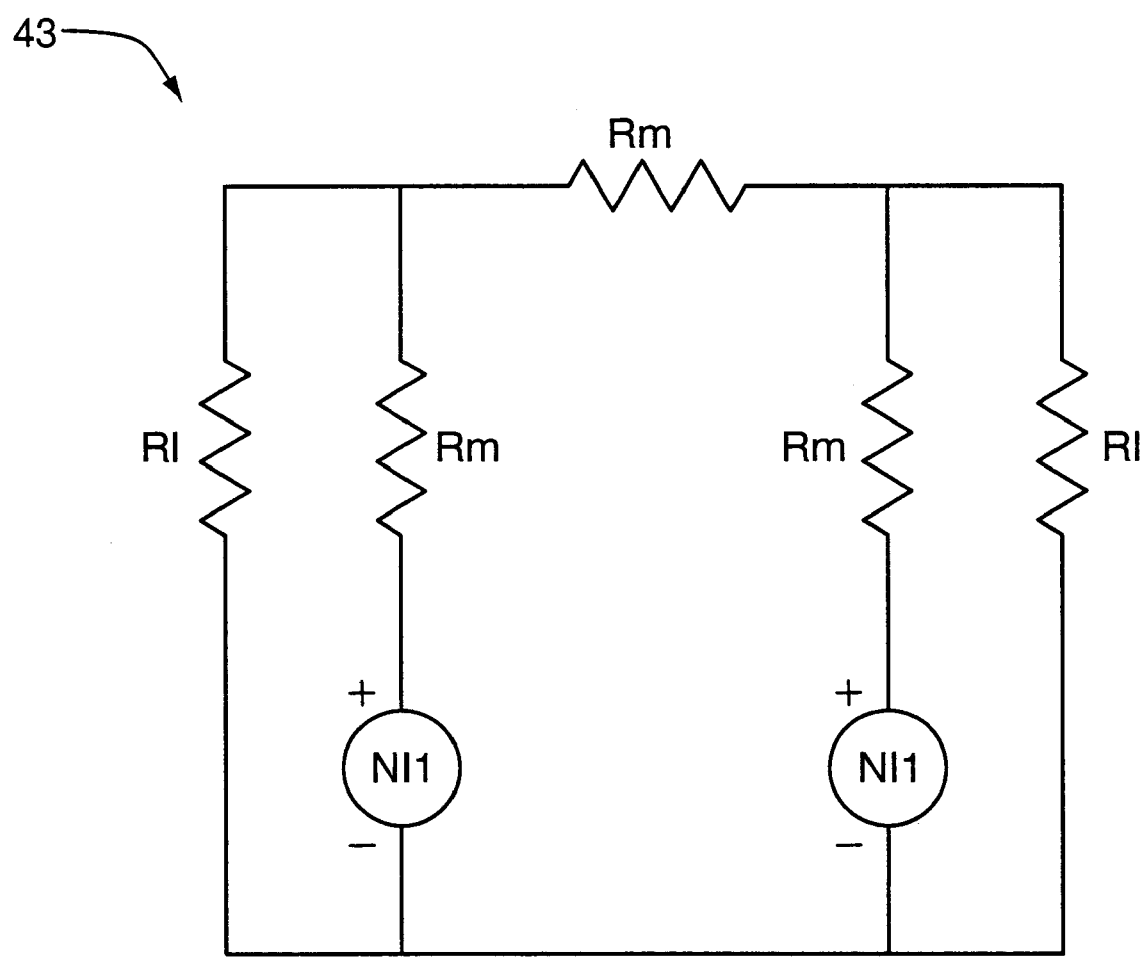
FIG. 3 shows a model operatively illustrating an electrical circuit analog for two magnetically coupled windings, in accord with the invention.

One condition in ideal transformer model 32 is that the sum of voltages across windings 34A, 34B is zero. An additional constraint may be considered with respect to FIG. 3, showing an electrical circuit 40 electrically modeling the magnetic schematic of FIG. 2. More particularly, when the magnetic structures of the invention afford good coupling between windings, the associated magnetic path reluctances are very low. In FIG. 3, "good coupling" is represented by Rm approaching zero; Rm being the reluctance through the core. With Rm approaching zero, the magneto-motive force (MMF) excitations (analogous to voltages) with values NI1 and NI2 are in parallel. Accordingly, NI1=NI2, and currents $i_1$ and $i_2$ (FIG. 2) are equal. The magnetizing reluctances Rm (analogous to resistances), will approach zero for perfectly coupled windings as Lm approaches infinity. In this case, only the leakage reluctances $R_l$ remain.

The sum of voltages across windings 34A, 34B within an ideal transformer 32 equals zero. Because currents $i_1$, $i_2$ are the same, the voltages across the two leakage inductances $L_1$, $L_2$ are also the same. Accordingly, when Vx1 switches to Vin and Vx2 to ground, as in a high-side and low-side synchronous buck converter configuration, then Vy1=Vy2= Vin/2 and the voltages across windings 34A, 34B add as (Vin−Vin/2)+(0−Vin/2)=0. Alternatively, when Vx1 and Vx2 are both switched to ground, then Vy1=Vy2=0, then the voltages across the windings 34A, 34B add as 0+0=0.

Figure 3A:
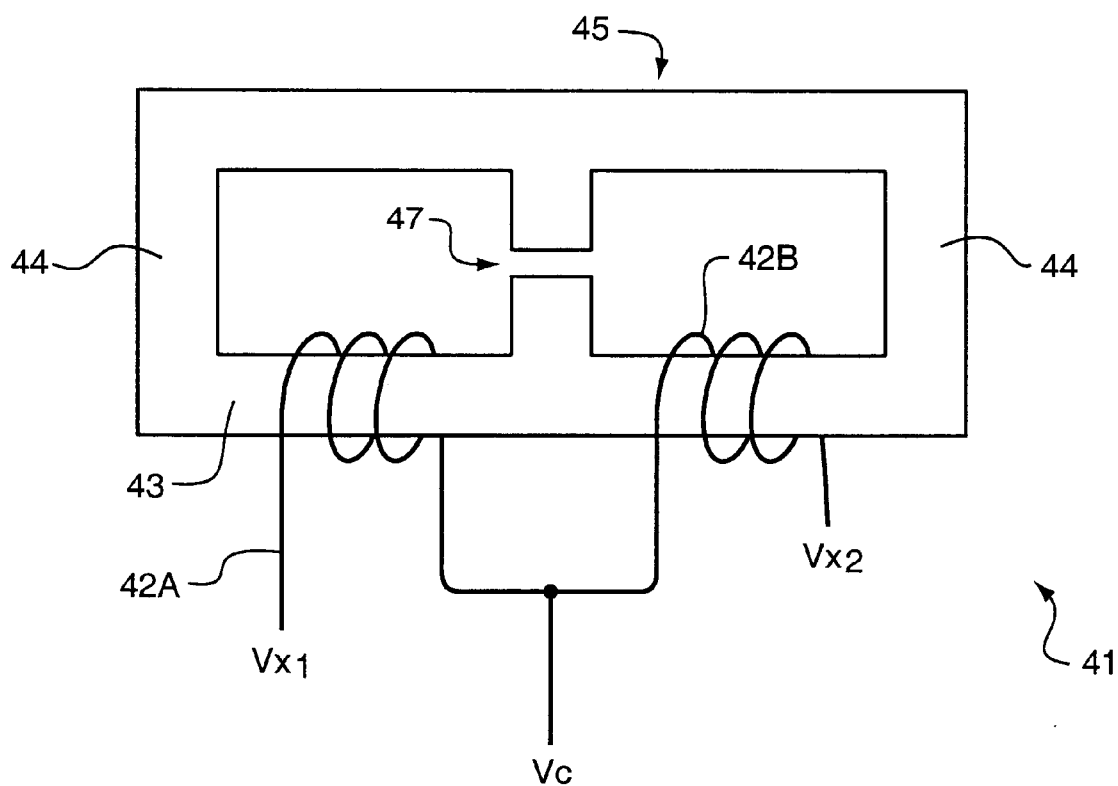
FIGS. 3A and 3B illustrate winding orientations to a core, in accord with the invention.
Figure 3B:
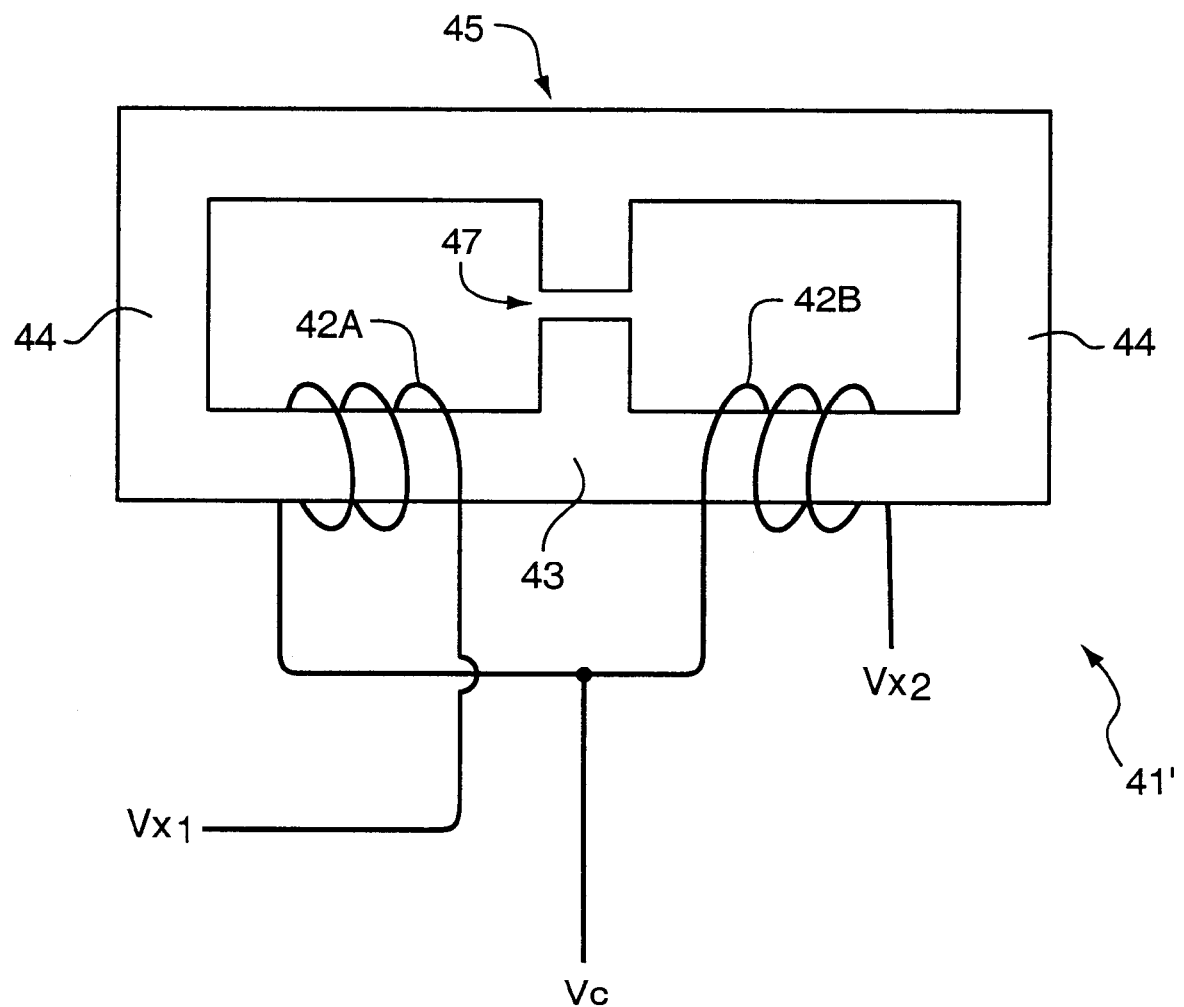

FIGS. 3A and 3B provide further understanding of how windings are properly oriented in accord with the invention. FIG. 3A illustrates a winding and core structure 41 with the windings 42A, 42B placed on the lower core legs 43 rather than on the two sides 44. In structure 41, windings 42A, 42B are considered in the same orientation because a current flow toward Vc in both leads to flux flow in opposite directions around the main, ungapped path of the core 45, just as in FIG. 1. Accordingly, the flux produced by equal currents in both windings 42A, 42B leads to flux in the leakage path (shown here a gapped center-leg 47).

FIG. 3B is similar to FIG. 3A, again with windings 42A', 42B' properly oriented. However, the physical orientation of windings 42A', 42B' has been reversed from FIG. 3A, but with electrical connections to Vx1, Vx2 also reversed. The net effect is that flux directions for a particular current direction is the same as for both FIG. 3A and FIG. 3B.

Figure 4:
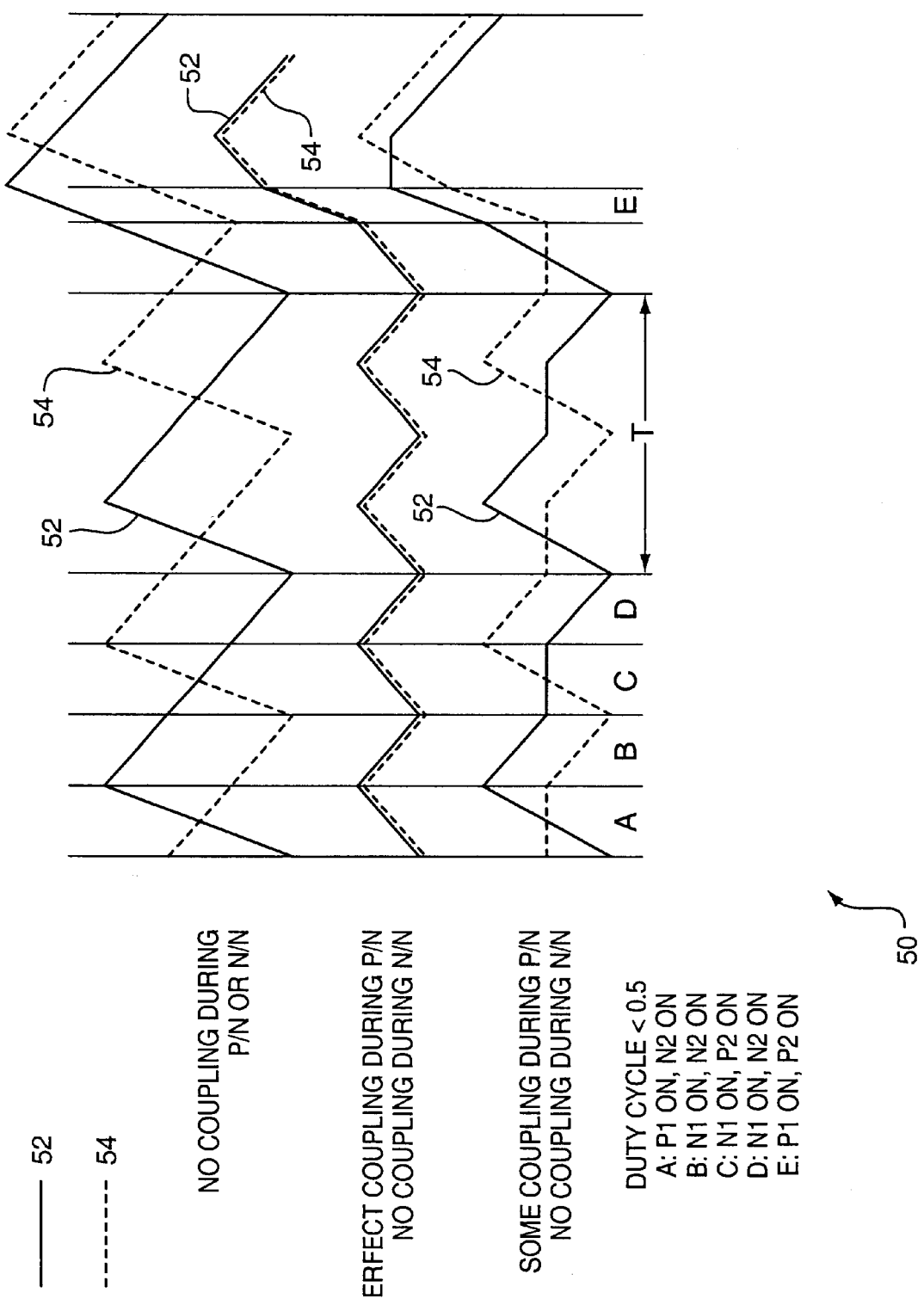
FIG. 4 illustrates various waveforms showing benefits of using two power stages with coupled magnetics in accord with the teachings of the invention.

The above description illustrates certain advantages of the invention. In regulators or converters with uncoupled inductors, each switch would be operated with some nominal period T, as shown in FIG. 4. The slopes of currents through the inductors are (Vin−Vout)/$L_l$ during high-side switch conduction, and −Vout/$L_l$ during low-side switch conduction. Once coupling is introduced, then the voltage across both inductors becomes (Vin/2−Vout)/$L_l$, when one power unit's high-side switch is on with the other unit's low-side switch on. The result of the coupling, then, is smaller ripple at twice the frequency, as shown in FIG. 4. FIG. 4 graphically illustrates a chart 50 of current ripple between two power units versus coupling between the windings. Line 52 represents data for the first power unit and line 54 represents data for the second power unit for each coupling scenario set forth on the left side of chart 50. A–E represent different activation cycling, as indicated, for a duty cycle <0.5. As annotated, P represents when a winding is switched to Vin; and N represents when a winding is switched to ground. During N/N, there is no interaction between windings. Based on the formula (Vin/2−Vout)/$L_l$, it becomes clear that for certain Vin, Vout combinations, zero ripple is achieved. In cases where Vout=Vin/2, then one high-side switch and one low-side switch is closed within the two power units; the value of leakage inductance $L_l$ does not matter. The leakage inductance can therefore be lowered to improve the transient response, during which there might be simultaneous turn-on of both high-side devices, or both low-side devices.

Note that the per-power-unit ripple current decreases, and the effective ripple frequency increases, with magnetic coupling even when the duty cycle is not 50%. It is therefore possible to lower the inductance $L_l$ and still achieve ripple currents that are smaller than the uncoupled ripple currents. As a result, use of the magnetically coupled constructs of the invention can improve the speed of transient response to load current changes while simultaneously reducing ripple currents.

It is also useful to understand what happens in the normal case when Lm is not infinite, and when the core does not have perfectly zero reluctance. In this case, any time there is a non-zero voltage across the ideal transformer windings 34A, 34B (FIG. 2), then the magnetizing inductance current will ramp up or down. As a result, the leakage inductances $L_l$ may not share the exact same voltage since the current derivatives through them are also not the same. However, even if Lm is as small as $3L_l$, the overall ripple cancellation in each power unit will still be significant.

By way of further explanation, the following describes metrics associated with good coupling between windings. The higher Lm is compared to $L_l$, the better the coupling. Specifically, when σ=Lm/$L_l$ is infinite, there is perfect coupling. Other references use a different formula to define the coupling effect: k=Lm/($L_l$+Lm), which is equal to one when there is perfect coupling. k=1 is the same condition as infinite σ. The following formula numerically illustrates how much current ripple can be reduced: resulting ripple/ original ripple=(σ+1−D(2σ+1))/((1+2σ)(1−D)), where D=Vout/Vin (the duty cycle). As σ goes to infinity (or k goes to 1) for "perfect" coupling, the resulting current ripple is minimized. For D=0.5, the resulting ripple equals zero.

In the prior art, with k=1, the ripple reduction no longer functioned properly. In designing systems with prior art methods, therefore, one would have to take care in designing to some optimal amount of coupling as quantified by k or σ. But even with such a coupling, the overall ripple reduction would not be more than about 20 or 25%. Using the methodology of the invention, ripple reduction is seen with improved coupling, even with perfect coupling.

Figure 5:
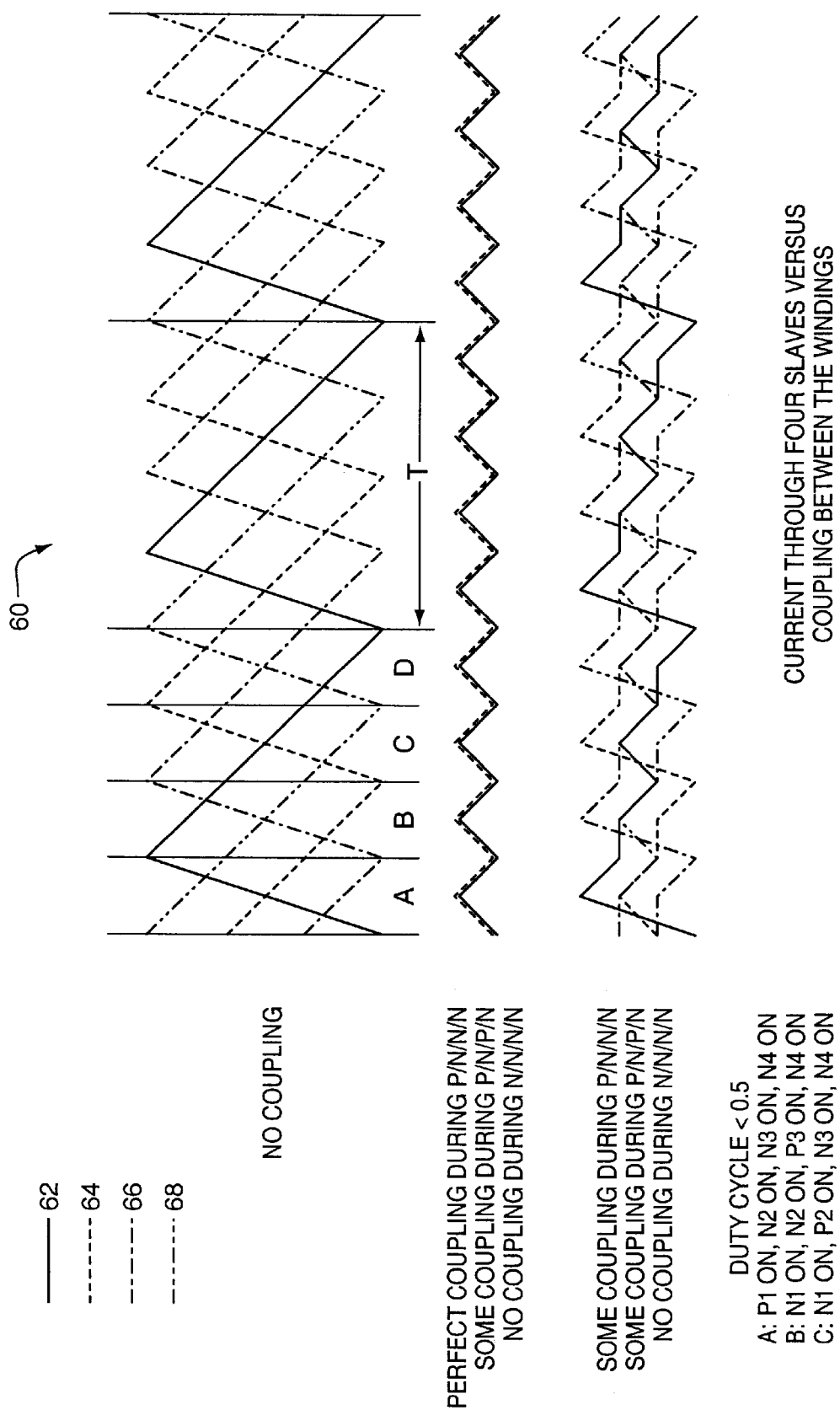
FIG. 5 illustrates various waveforms showing benefit of obtaining ripple reduction with N=4 power stages, each with a switching device coupled into a single coupled magnetic core structure, in accord with the teachings of the invention.

Note that the above two-power-unit discussion applies also to N power units. With two power units, it is assumed that one unit is switched 180 degrees out of phase with respect to the other. In the N-power unit case, the switching of the units is spread (or "phased") evenly through each overall switching period, as shown in the top of FIG. 5. Specifically, FIG. 5 shows a graph 60 similar to FIG. 4 but with comparison of four power units, shown as lines 62, 64, 66, 68.

Figure 6:
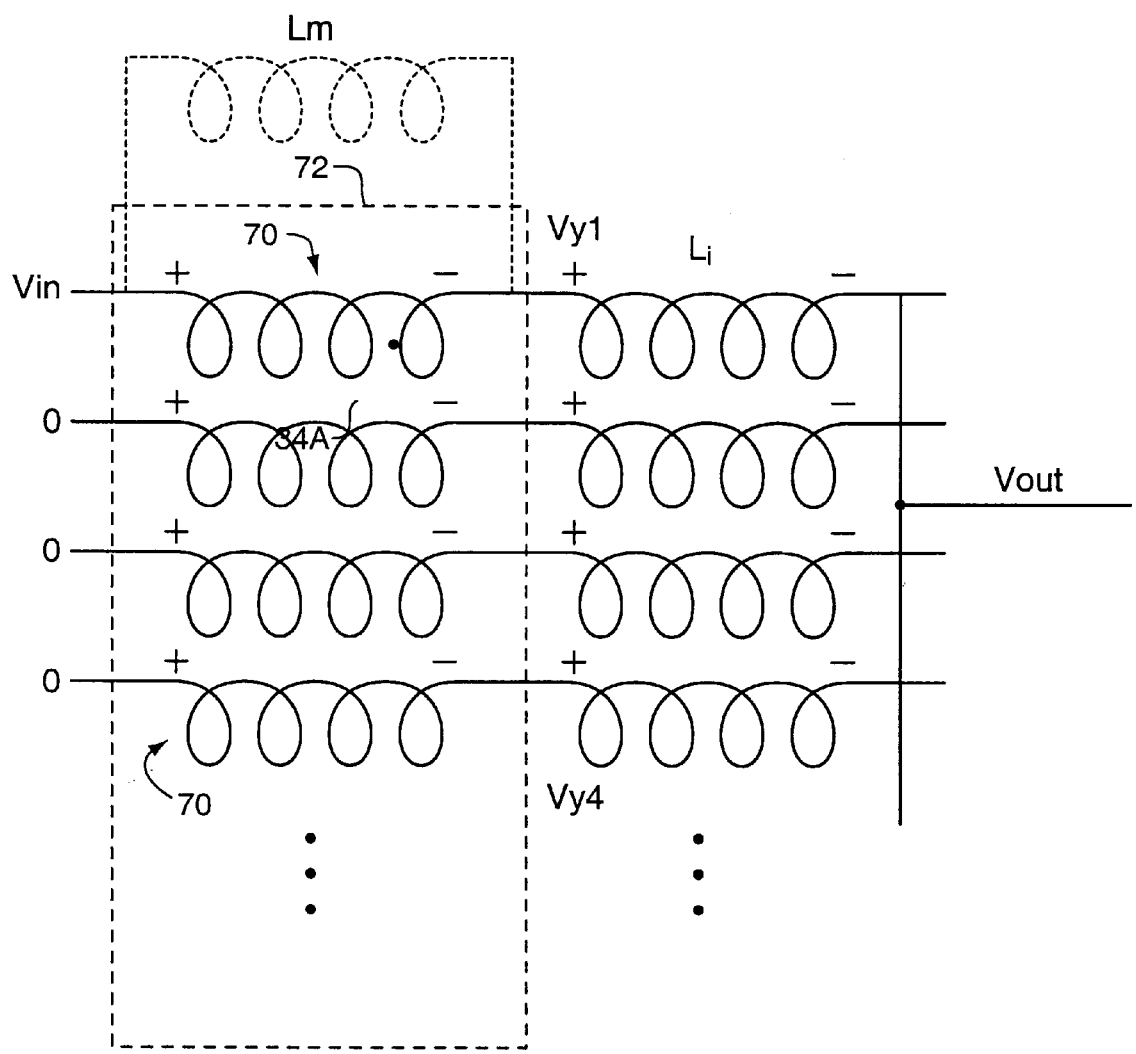
FIG. 6 shows a circuit model for a N wide coupled magnetic device used in a DC-to-DC switching power supply according to the teachings of the invention.
Figure 7:
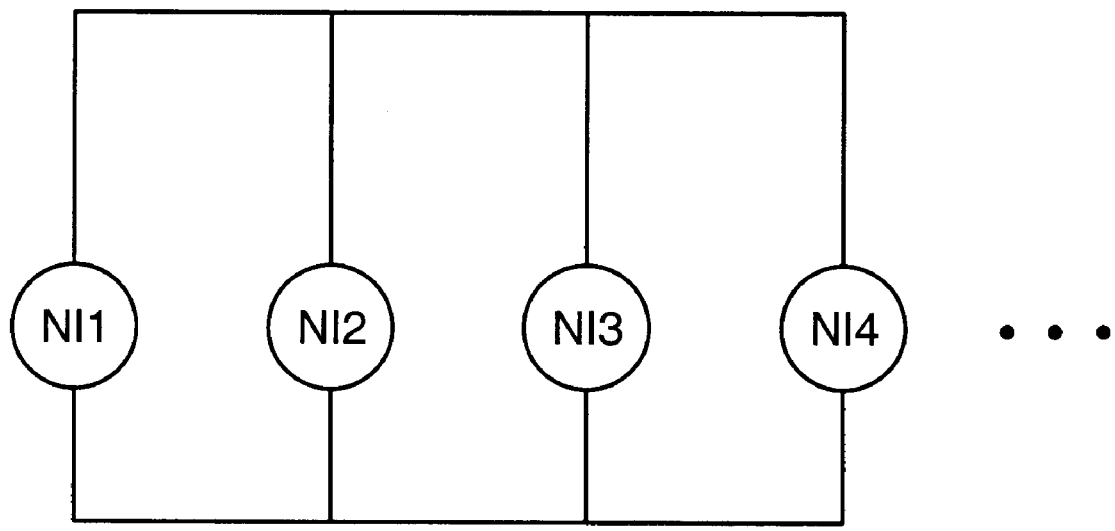
FIG. 7 shows an electrical circuit analog, similar to FIG. 3, that models N magnetically coupled windings, with zero reluctance appearing as zero resistance in the circuit branches.

FIGS. 6 and 7 are the corollary of FIGS. 2 and 3 except with an arbitrary number N of power units 70. With perfect coupling, the same constraints apply: the sum of all voltages within the ideal transformer 72 equals zero; and the currents in all leakage inductances $L_l$ are the same, since Rm=0. As a result of these constraints, the voltage at all Vy will be Vin/N when one high-side switch among all power units 70 is on. The slope of current in each inductor 70 is (Vin/N− Vout)/$L_l$, which is a reduction from (Vin−Vout)/$L_l$. The value Vy=Vin/N is valid only when one of the power units' high-side switches is on. When enough power units are phased across one period, or when the duty cycle is high enough such that two or more phases may simultaneously have an activated high-side switch, then Vy=2Vin/N, or 3Vin/N, etc. Hence for that moment, the rising current slope (mVin/N−Vout)/$L_l$, with m>1, is higher than (Vin/N−Vout)/$L_l$. In subsequent periods when only one high-side switch is on, then Vy=Vin/N and the overall ripple is still reduced. In FIG. 7, Lm is deemed infinite, and each MMF (NI1–NI4) is equal when the reluctances are zero. The resulting fluxes may not be zero, however, even if currents are equal.

When coupling is imperfect (i.e., Lm is not infinite), then like the earlier case the current slopes among each power unit's winding currents may not always be the same. FIG. 5 shows how the current waveforms look for no coupling (top), perfect coupling (middle), and moderate ($0 \leq Lm \leq$ infinity) coupling. Even for moderate coupling, there is reduction in the AC peak-to-peak current ripple. Similarly, if $L_l$ is not matched across all windings, then ripple cancellation may not be uniform for each power unit. However, the overall ripple reduction, compared to uncoupled magnetics, will be substantial within each power unit.

As with two phases, when the coupling is perfect, the ripple reduction is maximized. Similarly, no matter how many phases, better coupling (even perfect coupling) means better ripple reduction. In designing systems of the invention, coupling is preferably maximized. $L_l$, the leakage inductance, may also be adjusted in order to optimize for transient responses. Fortunately, Lm only needs to be about three times larger than $L_l$, but the value exactly for Lm is not critical.

Figure 8:
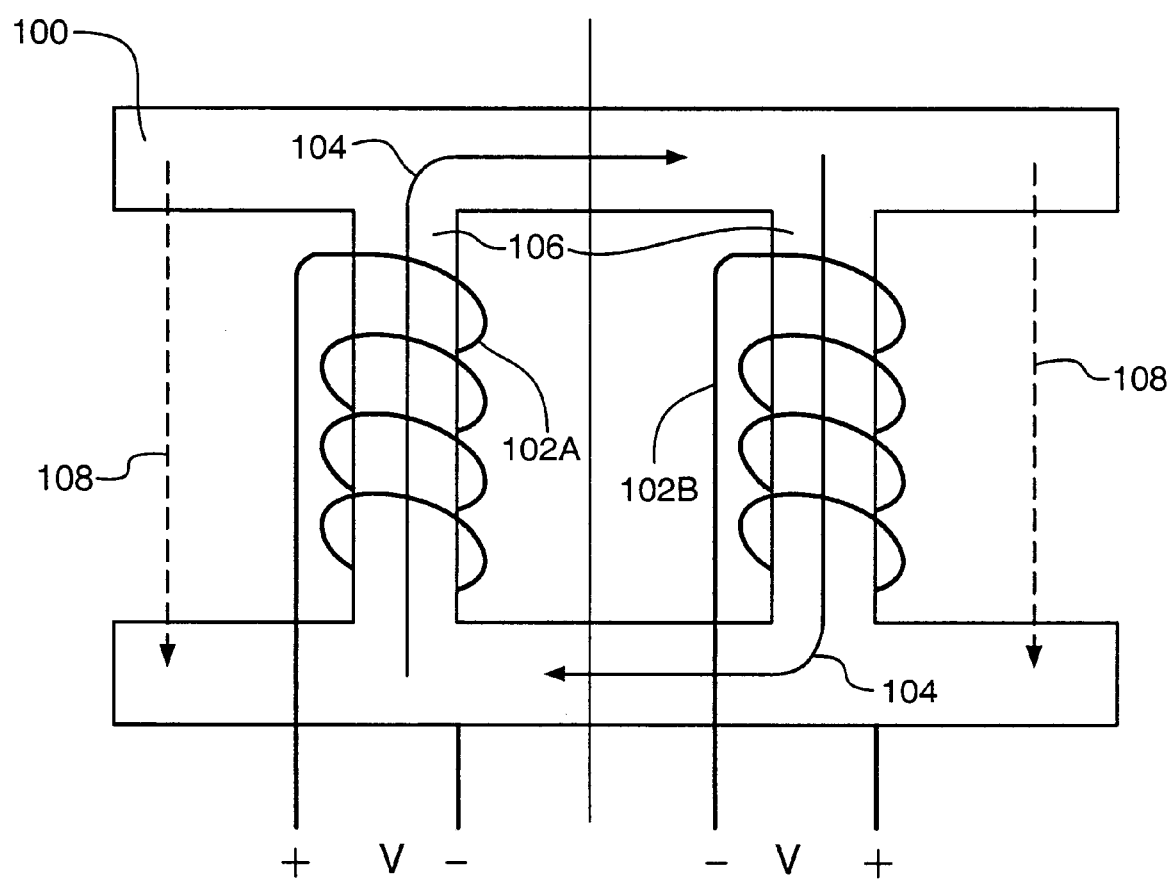
FIG. 8 shows a magnetic device with a continuous square core shape, and windings with equal and opposite voltage excitation, in accord with the invention.

As noted above, the magnetic core structures described herein are also desirable features of the invention. FIG. 8 for example shows a magnetic core 100 and windings 102A, 102B arranged such that the core has a square shape, including core legs or rungs 106. In one example, windings 102A and 102B are exited with equal voltage magnitudes, but with opposite signs, so that the direction of increase in flux 104 developed in each winding's rung 106 is opposite from the other; and the resulting flux generally flows around the square as shown. Some small leakage flux also flows as shown in dotted lines 108, but since the permeability of the core is much higher than that of the medium outside the core (typically air), flux 104 chooses core 100 as the permeability path. As a result of the flux following a higher permeability path, the net inductance seen at each winding 102 with this excitation is higher, and thus the net current ripple is lower. In other words, low reluctance path 104 enables flux change with very little winding current change compared to higher reluctance paths (such as leakage path 108).

Figure 9:
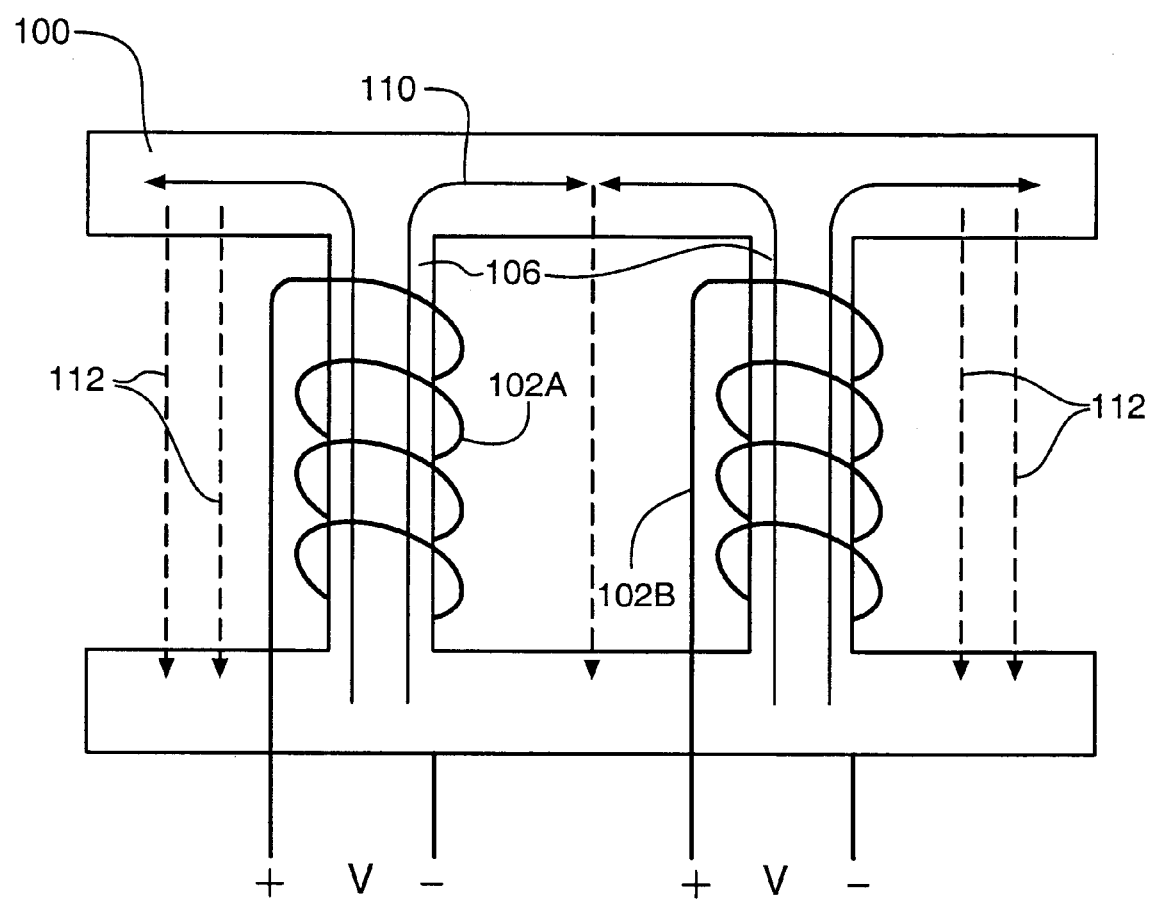
FIG. 9 shows the device of FIG. 8 but with an equal and same sign voltage excitation to the two windings.

FIG. 9 shows the same core 100 and windings 102A, 102B of FIG. 8; except that the windings 102A, 102B of FIG. 9 are excited with voltage of the same sign and magnitude. Due to symmetry, flux cannot effectively flow through core 100 along permeability path 112, and all flux developed with this excitation essentially flows, as shown, in leakage paths 110. Ripple current caused by excitation of FIG. 9 is higher than in FIG. 8 since higher reluctance paths of flux relate to larger winding current deviations. The two paths—leakage path 112 and the high permeability inner-core path 110, correspond to the $L_l$ and Lm inductances in the above-described models.

As described briefly above, FIG. 4 illustrates reduction ripple with coupling between windings. In the top portion of graph 50, the uncoupled peak to ripple is shown at the switching frequency in each phased power unit. In the middle portion of graph 50, the ripple is reduced because of perfect coupling. The bottom portion of graph 50 shows currents with reduced ripple in the presence of imperfect coupling (or finite Lm). When both low-side devices are on, then the excitation on the two windings is in the same direction, as in FIG. 9, and flux will follow only the leakage paths 112. As a result, each winding's falling current slope is the same as if there were no coupling between the two inductors. However, when one high-side switch and one low-side switch is on, then the flux is shared, as in FIG. 8, with the result of lower reluctances in the flux path and smaller current ripple than had there been no coupling. Good coupling during this excitation means that the change in flux in each winding is nearly equal and opposite in sign. As a result, the direction of current change in each winding will be the same; and the current in a winding whose low-side switch is on will go up since it is coupled to the winding whose highside switch is on. At the same time, as shown in FIG. 4, the effective frequency of the current waveform in each winding has multiplied by two, even though the switching at each winding remains at the original frequency.

Figure 10:
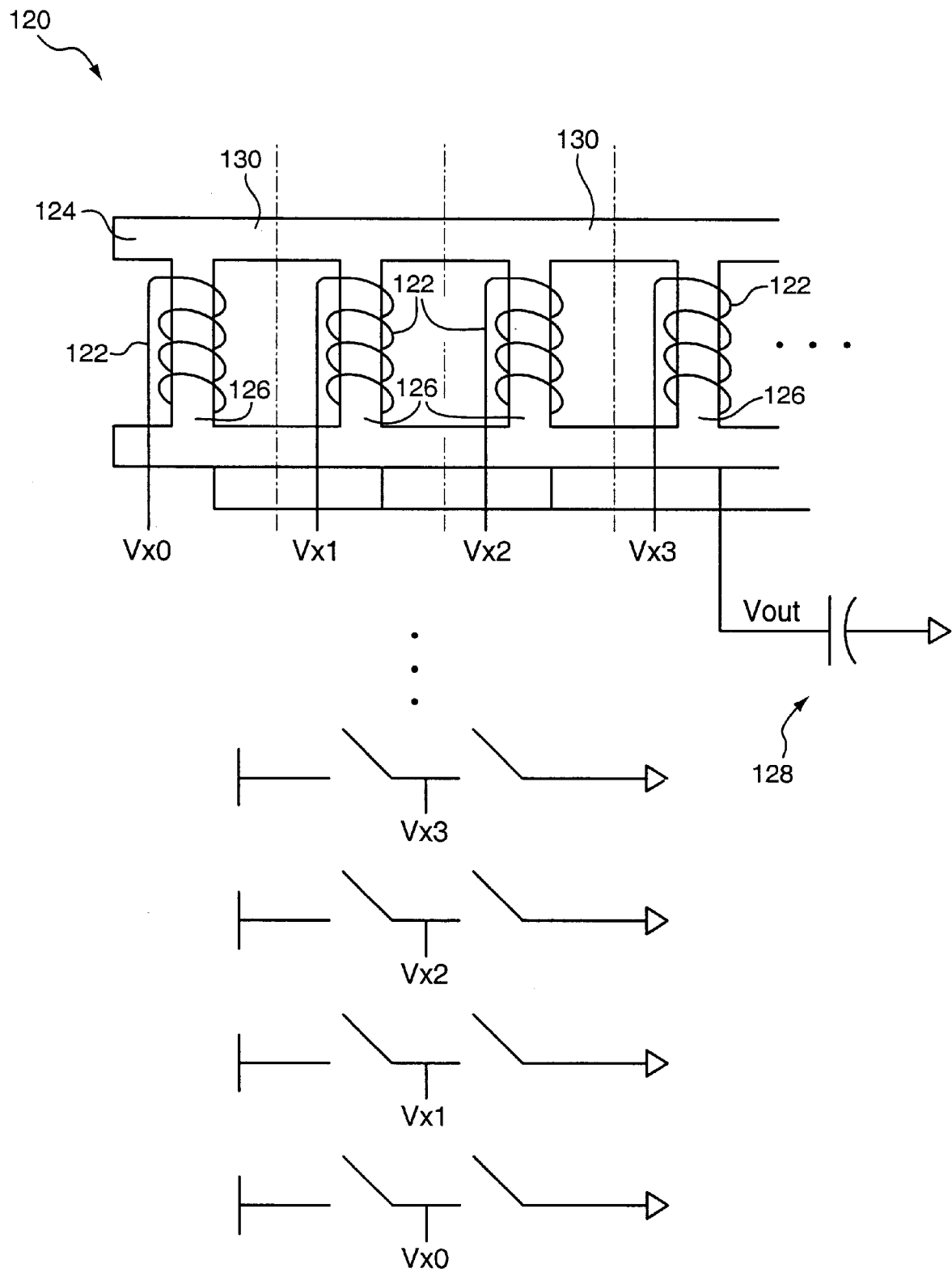
FIG. 10 shows a multiphase, paralleled power unit DC-to-DC switching power supply with a composite magnetic structure, constructed according to the invention.
Figure 11:
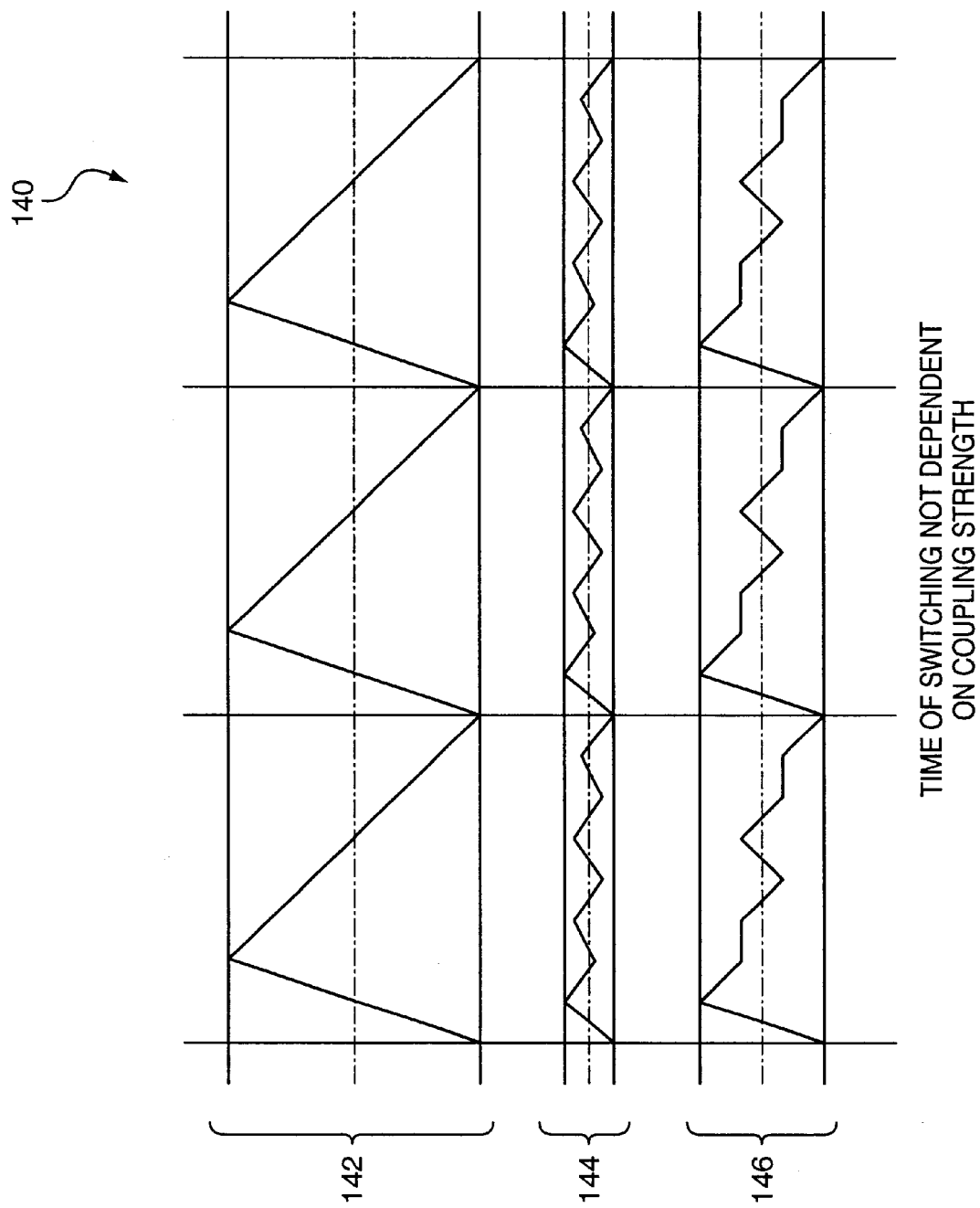
FIG. 11 graphically depicts results in controlling high- and low-side switches based on a current envelope, and as a function of coupling, in comparing coupling effects in a converter.

In FIG. 10, there is shown a coupled magnetic structure 120 with more than two windings 122 on a common core 124. Core 124 is in a "ladder" configuration with a plurality of "rungs" 126 coupled with windings 122. In each case, windings 122 are wound with like orientation on rungs 126. Structure 120 also has a capacitive output 128 linked to Vout. In prior art uncoupled inductors, ripple current cancellation occurs only in capacitor 128. Structure 120 is thus intended to be used in a DC-to-DC converter with more than two parallel power units, generating Vout from the input voltage Vx. FIG. 11 shows the results of operation of structure 120 in the current ripple when excited by properly phased power units, as a function of coupling. In order for proper phasing and current ripple to occur, a properly phased set of PWM pulses needs to synchronously activate or disable the switches within each power unit (e.g., switches 12, FIG. 1). N phases are spaced evenly within 360 degrees (or timed evenly within one period) in order for the ripple cancellation to be evenly distributed among all power units. Properly switched, each phase will experience an increase in its effective current ripple frequency. In FIG. 11, the top part 142 of chart 140 illustrates the case of no coupling; the middle part 144 illustrates the case of excellent coupling, such that the interaction during P/N decreases ripple, and the lack of interaction during N/N allows fast transient response; and the lower part 146 illustrates the case of limited coupling.

Thus reducing ripple current in accord with the invention is further enhanced with more magnetic branches in the common magnetic core structure. At some point, the ripple current, which can easily be as high as ten amps in certain applications, can be reduced to below one amp. As a result, the parallel power units may be thought of as current sources. The structure of FIG. 10 can thus be viewed as a multiplication of the structures shown in FIG. 8 and FIG. 9. It is possible to add on sections (e.g., rungs 126 and windings 122) to create a larger, scaled, one-piece device. The core may be constructed as a single piece, or may be constructed by joining pieces, one piece per phase, or one per two phases, etc. This modular scheme has the advantage that it is possible to construct converters for different power ratings using different numbers of sections, while only stocking one size of core piece and avoiding investment in tooling for different cores.

Another advantage is that systems that use coupled magnetic structures can require less area on printed circuit boards, compared to using N power units with N uncoupled inductors, which would need additional space around the inductors. The benefits of the invention are thus apparent, and with one single coupled inductor device, most of the surrounding area is eliminated, saving space.

As the structure grows larger, coupling between all windings may become less perfect. It is thus recommended that the different phases be laid out such that the physically adjacent windings are as far apart as possible in phase, so that the stronger coupling between adjacent phases has the maximum ripple reduction effect. In any event, perfect coupling is not required to achieve improved current ripple cancellation. As described below, slightly less than perfect coupling can also be used advantageously.

The above-described structures show the benefits of forming multiple windings on a common core, with windings in like orientation and proper excitation. Certain detail can be added:

1) The leakage path is usually of relatively high reluctance, compared to the magnetizing flux path. The leakage flux path may be a natural result of the core structure and winding placement, in which case no additional structure is needed. Or, the leakage path may use an explicitly gapped high permeability core leg or shunt, un-gapped low permeability core leg or shunt, or a core extension, that reduces the reluctance of the leakage air path. The leakage path may also be effected by some combination of these additional structures.

2) It is desirable that each winding independently generate magnetic flux in its own core segment (e.g., a rung), and to couple that flux into a low reluctance core. With a ladder structure as in FIG. 10, the fluxes in each winding 122 are coupled into core 124 appropriately. When all windings 122 are excited with the same current, only the leakage paths are effectively available for flux, and flux does not effectively travel from one winding 122 to another. When certain windings 122 are excited by high-side switching, and some windings 122 by low-side switching, a changing flux is produced. The new flux travels from one winding 122 to another. With ladder type multiple winding (N>2) magnetic structures, as in FIG. 10, windings should be with the ladder rungs, and not on the ladder risers 130 (except for the windings at either end, for which any position around the same flux path is equivalent).

The following bullets summarize certain advantages of the invention:

Reduced current ripple. This reduces losses in the inductor windings and in the switches. This can lead to fewer paralleled units with higher current ratings, and/or less expensive parallel power units with relaxed current ratings. Smaller peak currents aid in improving reliability of devices. Although the overall ripple current reduction in the output capacitance is the same as it is for an uncoupled multi-phase converter, it can be difficult to realize the full benefit of that cancellation in an uncoupled multi-phase converter, because large ripple currents must flow between the outputs of the different phases. For example, in some physical arrangements with multiple parallel output capacitors, the large ripple currents flowing between phases may lead to voltages differences between these capacitors, despite the intention to have them in parallel, all at the same voltage. The results of this include local ripple currents in individual capacitors that do not cancel as intended, and sometimes difficulties is controlling the output voltage, that is now different at different points.

Smaller inductance for transient response while maintaining reasonably small steady-state current ripple.

Enables lower overall transistor switching frequency if the effective per winding current ripple frequency increase is matched to the original switching frequency. This can reduce switching losses, allowing more power to be handled by the same switches, allowing the switches to run at a lower temperature, or allowing the switches to be made smaller or with less heatsinking, or some combination of these benefits.

Scalability is possible. The nature of activation in combination with the physical construction of various magnetic structures enables arbitrarily increasing numbers of power units to produce further and further ripple reduction benefit while still controlling the same way. Size reduction also occurs when the space around inductors on a PCB is eliminated, as the inductors are combined into one structure.

Ease of manufacturing. One can construct a single core structure with a winding, and then place multiple such cores and windings in a row. Adding more pieces helps reduce ripple in each winding further, and has few if any undesirable effects.

Selecting current ripple reduction. In the invention, the higher the coupling coefficient, the better the current ripple reduction, so long as the coupling coefficient is increased by increasing Lm while holding $L_l$ constant (where coupling coefficient is defined as $k=Lm/(L_l+Lm)$, assuming equal $L_l$ on all phases).

Figure 12:
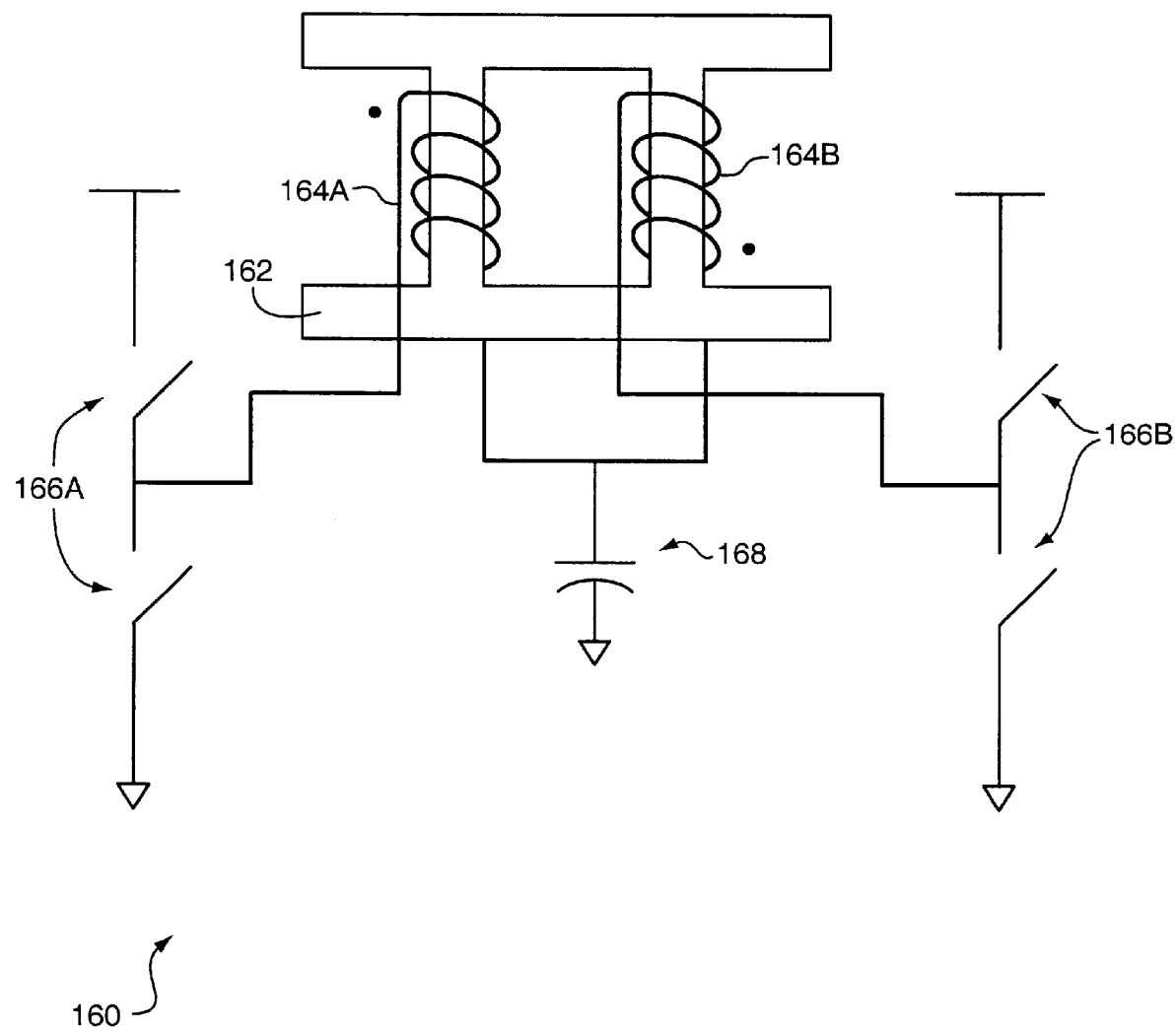
FIG. 12 shows a dual phase, paralleled power unit DC-to-DC switching power supply with a composite magnetic structure, constructed according to the invention.

FIG. 12 shows a dual phase, parallel power unit DC-to-DC switching power supply 160 with a composite magnetic core structure 162. Supply 160 illustrates one specific application of the invention, and includes two windings 164 coupled to switches 166 to alternatively excite the windings and generate an output voltage 168 with reduced current ripple. FIG. 12 also illustrates a "power unit" as sometimes used herein. Specifically, switch 164A and winding 166A form one "power unit" and switch 164B and winding 166B form another "power unit."

Figure 13:
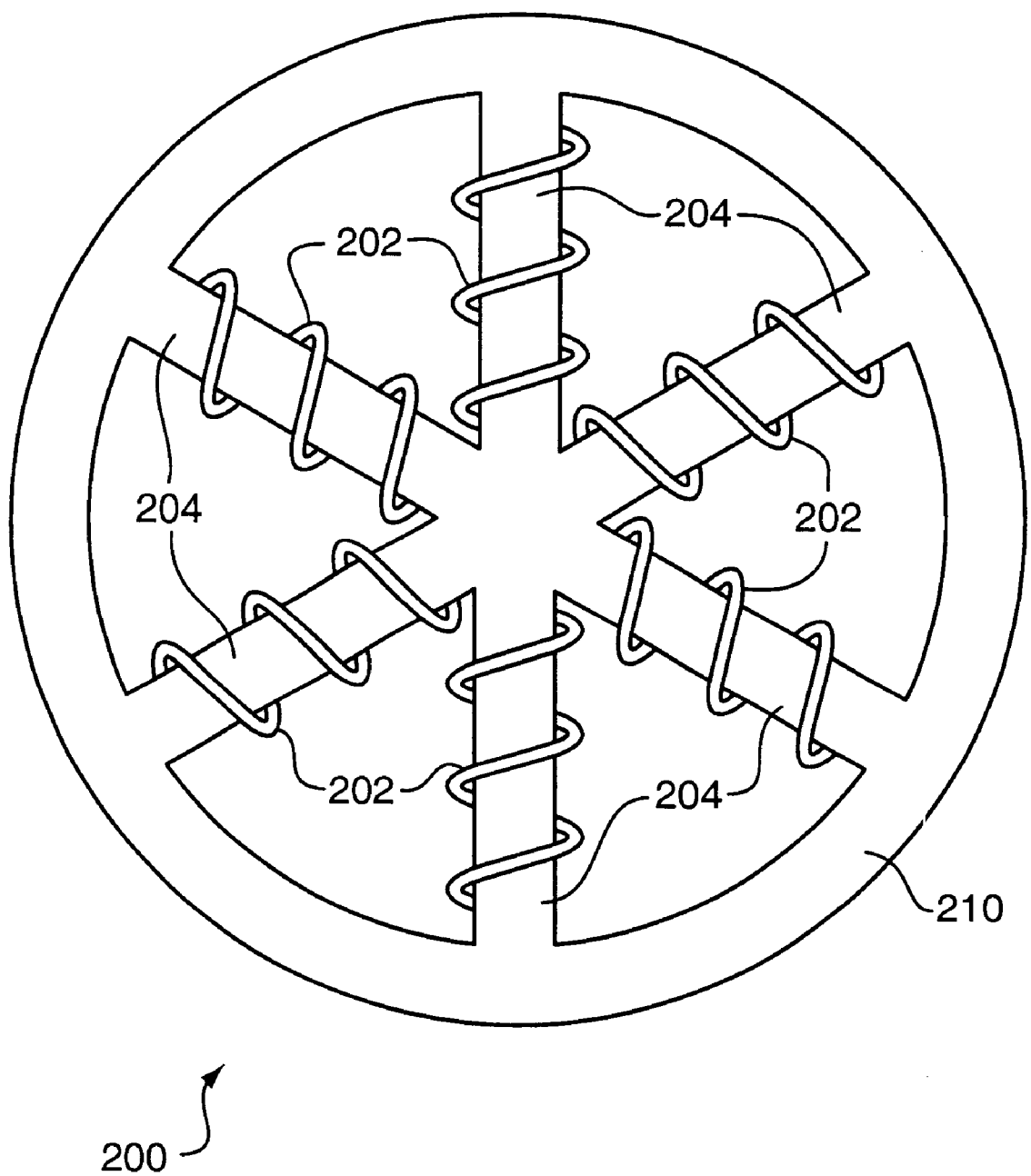
FIG. 13 shows a wheel and spoke core structure constructed according to the invention.

FIG. 13 shows a wheel and spoke core structure 200 constructed according to the invention. Windings 202 couple with separate spokes 204 of structure 200; though spokes 204 and rim 206 form a continuous core 210. Structure 200 operates similarly to the ladder structure described above in connection with FIG. 10, deriving like benefits with windings 202 on spokes as windings 122 on rungs 126.

Figure 14:
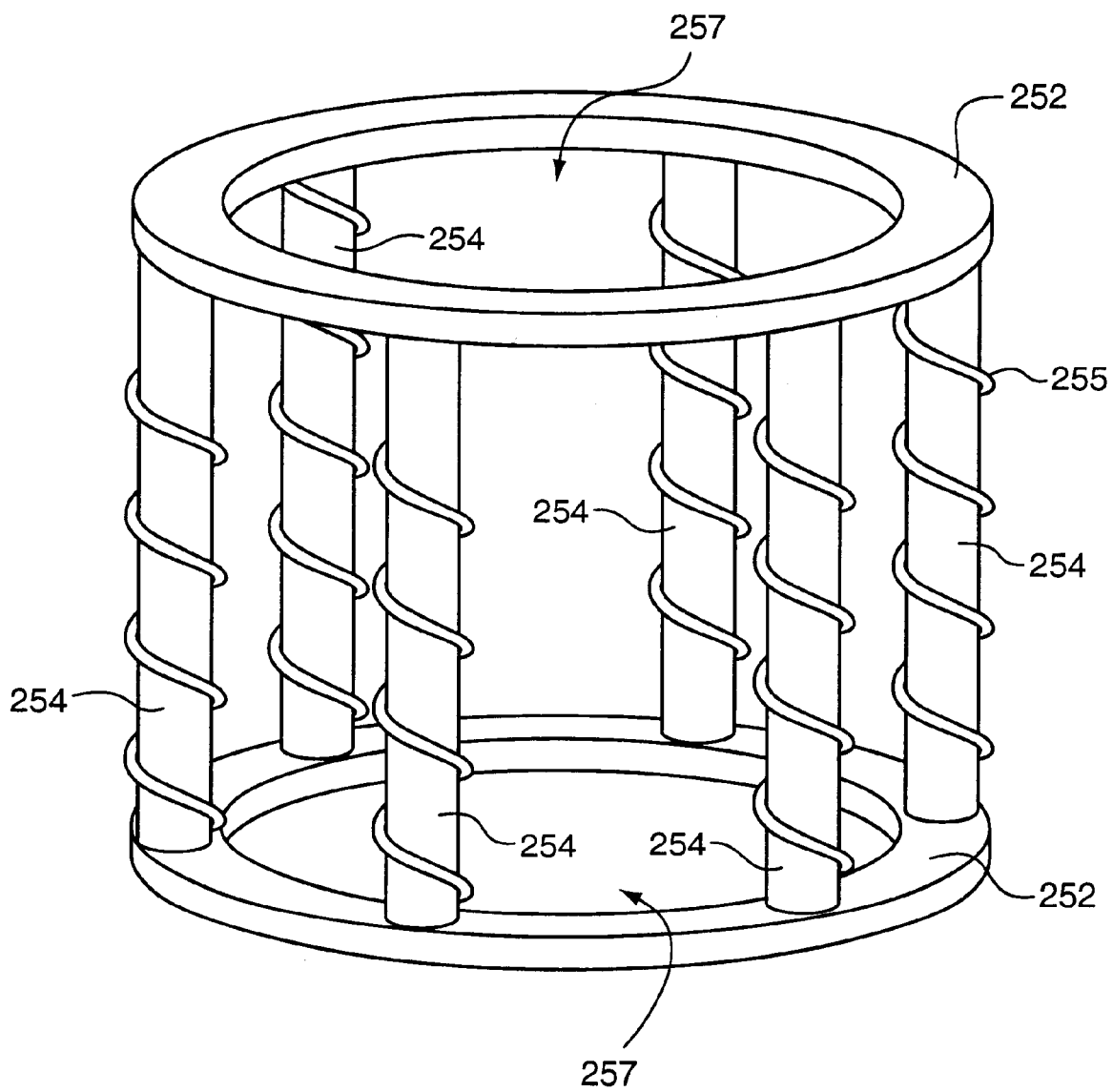
FIG. 14 shows a two-ring and column core structure constructed according to the invention.

FIG. 14 shows a two-ring and column core structure 250 constructed according to the invention. The two rings 252 and columns 254 form a continuous core, with windings 255 wound on columns 254. Structure 250 operates similarly to the ladder structure described above in connection with FIG. 10, deriving like benefits with windings 202 on spokes as windings 122 on rungs 126. As an alternative, rings 252 of structure 250 can be disks or plates (i.e., without an aperture 257, round or otherwise); those skilled in the art should appreciate that this disk or plate structure is within the scope of the invention.

The invention thus attains the objectives set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. For example, those skilled in the art should appreciate that various systems are described herein, including power systems with multiple phases and windings. Typically, each phase has an equal number of windings per turn. Those skilled in the art should thus appreciate that windings with differing numbers of turns can also be included in the various phases of such systems. For example, in accord with the invention, the dc current within each phase may be altered—with the number of turns in the windings also altered—so that the product of NI is the same for each phase.

It is also to be understood by those skilled in the art that the following claims are to cover all generic and specific features of the invention described herein, and all statements of the scope of the invention which, as a matter of language, might be said to fall there between.

Having described the invention, we claim:

1. A DC-to-DC converter for providing an output voltage from an input voltage, comprising first and second inductive windings and a magnetic core cooperatively forming a magnetizing inductance, a first voltage across the first winding being switched at about 180 degrees out of phase with a second voltage across the second winding, to regulate magnitude of the output voltage, the first and second voltages being formed from one or a combination of the input and output voltages, each of the first and second windings having a leakage inductance and being coupled to the magnetic core wherein magnetizing inductance is at least three times greater than the leakage inductance of either winding, the first winding being wound about the core in a first orientation, the second winding being wound about the core in the first orientation.

2. A converter according to claim 1, wherein the input voltage comprises first and second input voltages.

3. A converter according to claim 2, wherein the second input voltage comprises ground, wherein the converter operates as a buck converter.

4. A converter according to claim 1, further comprising one or more transistors for switching the windings out of phase wherein a current per time slope during the time intervals in which current is increasing through the windings is approximately defined by the output voltage divided by the leakage inductance subtracted from one half the input voltage divided by the leakage inductance.

5. A converter according to claim 1, wherein the windings and core are constructed and arranged to substantially maximize coupling between windings by maintaining the leakage inductance at a substantially constant level while increasing the magnetizing inductance.

6. A converter according to claim 1, wherein the core comprises first and second substantially parallel core elements, the first winding being wound about the first core element the first orientation, the second winding being wound about the second core element in the first orientation.

7. A converter according to claim 6, further comprising one or more connecting elements rigidly coupling the first and second parallel core elements together.

8. A converter according to claim 1, wherein the core comprises one of a gapped high-permeability element and a low-permeability element, to serve as a leakage path structure to carry at least part of a leakage flux, the leakage flux being defined as a flux present when each of the windings has an equal DC current.

9. A converter according to claim 8, wherein the leakage path structure comprises a core leg or shunt.

10. A converter according to claim 1, further comprising circuitry to activate one or more of the windings at a selected duty cycle.

11. A converter according to claim 10, wherein the duty cycle comprises a duty cycle between about 5% and 90%.

12. A converter according to claim 10, wherein the duty cycle is about 50%.

13. A converter according to claim 1, further comprising circuitry to alternatively activate each of the windings at about 50% duty cycle.

14. A converter according to claim 1, wherein one end of each of the windings is switched between the input voltage and ground.

15. A converter according to claim 1, wherein the first and second windings have an equal number of turns in the windings.

16. A converter according to claim 1, wherein the first winding has a first number of turns and the second winding has a second number of turns, the first number being different from the second number, and wherein a NI product for each of the first and second windings is substantially equal.

17. A method for reducing ripple in a DC-to-DC converter of the type producing an output voltage from an input voltage, comprising the steps of:
   orienting, in like direction, first and second windings about a common core to increase coupling between the windings; and
   alternatively activating each winding about 180 degrees out of phase with the second winding, to regulate magnitude of the output voltage.

18. A method of claim 17, further comprising switching the voltages across the windings by connecting one end of each winding to a common output voltage, and individually switching the other end of each winding between ground and an input voltage.

19. The method of claim 17, further comprising the step of forming the core with two substantially parallel core elements, wherein the step of orienting comprises orienting each of the windings on a separate core element.

20. The method of claim 17, further comprising the step of activating one or more of the windings at a selected duty cycle.

21. The method of claim 20, wherein the step of activating comprises activating the windings at a duty cycle between about 5% and 90%.

22. The method of claim 20, wherein the step of activating comprises activating the windings at a duty cycle at about 50%.

23. The method of claim 17, further comprising the steps of forming a first number of turns in the first winding and a second number of turns in the second winding.

24. The method of claim 23, wherein the first number is different from the second number, and further comprising the steps of applying a first current through the first winding and applying a second current through the second winding, the first current being different from the second current, wherein a NI product for each of the first and second windings is substantially equal.

25. A DC to DC converter for providing an output voltage from one or more input voltages, comprising (a) a common magnetic core and (b) N inductive windings alternatively switched, at one end, to regulate magnitude of the output voltage, each of the windings having a turn-on switching transition separated in switching phase by at least about 360/N degrees from any other of the windings, each of the windings having a turn-off switching transition separated in phase by at least about 360/N degrees from any other of the windings, each of the N windings being wound about the core in like orientation, N being an integer greater than or equal to three.

26. A converter of claim 25, wherein each of the windings comprises a leakage inductance, each of the windings being coupled the common magnetic core wherein magnetizing inductance defined by magnetic interaction between the windings is greater than about three times the leakage inductance of any one of the windings.

27. A converter according to claim 26, further comprising one or more transistors for switching the windings out of phase wherein a current per time slope during the time intervals in which current is increasing through the windings is approximately defined by the output voltage divided by the leakage inductance subtracted from the input voltage divided by the leakage inductance divided by N.

28. A converter according to claim 26, wherein the windings and core are constructed and arranged to substantially maximize coupling between windings by maintaining the leakage inductance at a substantially constant level while increasing the magnetizing inductance.

29. A converter according to claim 26, wherein one or more of the windings comprise a gapped high permeability element to carry at least part of a leakage flux, the leakage flux being defined as a flux present when each of the windings has an equal DC current.

30. A converter of claim 25, wherein the core comprises a wheel and spoke configuration, and wherein each of the windings are wound about separate spokes of the configuration.

31. A converter of claim 25, wherein the core structure comprises a two-plate and multiple column configuration, and wherein each of the windings are wound about separate columns of the configuration.

32. A converter of claim 25, wherein the core structure comprises a two-ring and multiple column configuration, and wherein each of the windings are wound about separate columns of the configuration.

33. A converter according to claim 25, wherein the input voltages comprise first and second input voltages, the second input voltage comprising ground, wherein the converter operates as a buck converter.

34. A converter according to claim 25, wherein the core comprises N substantially parallel core elements, the N winding being wound about the N core elements in a same orientation.

35. A converter according to claim 34, further comprising one or more connecting elements rigidly coupling adjacent N parallel core elements together.

36. A converter according to claim 25, further comprising circuitry to activate one or more of the windings at a selected duty cycle.

37. A converter according to claim 36, wherein the duty cycle comprises a duty cycle between about 5% and 90%.

38. A converter according to claim 37, wherein the duty cycle is about 50%.

39. A converter according to claim 25, wherein each of the N inductive windings comprises an equal number of turns.

40. A converter according to claim 25, wherein at least one of the N inductive windings comprises a different number of turns from at least one other of the N windings.

* * * * *

UNITED STATES PATENT AND TRADEMARK OFFICE
CERTIFICATE OF CORRECTION

PATENT NO.    : 6,362,986 B1                                                            Page 1 of 1
DATED         : March 26, 2002
INVENTOR(S)   : Aaron M. Schultz and Charles R. Sullivan It is certified that error appears in the above-identified patent and that said Letters Patent is hereby corrected as shown below:

Column 14,
Line 5, should read as follows:
-- 17. A method for reducing ripple in a DC-to-DC converter of the type producing an output voltage from an input voltage, comprising the steps of:

orienting, in like direction, first and second windings about a common core to increase coupling between the windings; and alternatively activating [each] the first winding about 180 degrees out of phase with the second winding, to regulate magnitude of the output voltage. --

Signed and Sealed this

Sixteenth Day of July, 2002

*Attest:*

JAMES E. ROGAN
*Attesting Officer*              *Director of the United States Patent and Trademark Office*